United States Patent
Willson

[11] 3,731,059
[45] May 1, 1973

[54] COOKING COMPUTER
[75] Inventor: James R. Willson, Garden Grove, Calif.
[73] Assignee: Robertshaw Controls Company, Richmond, Va.
[22] Filed: Feb. 1, 1971
[21] Appl. No.: 111,727

Related U.S. Application Data
[63] Continuation-in-part of Ser. No. 47,345, June 18, 1970, abandoned.

[52] U.S. Cl. .................................................235/61 A
[51] Int. Cl. ..............................................G06c 29/00
[58] Field of Search ....................235/84, 61 R, 61 A, 235/88; 99/332, 327; 219/489

[56] References Cited
UNITED STATES PATENTS

| | | | |
|---|---|---|---|
| 2,663,786 | 12/1953 | Illian et al. | 99/332 X |
| 2,838,646 | 6/1958 | Welch | 219/489 |
| 3,072,327 | 1/1963 | Perry | 235/61 A |
| 3,166,242 | 1/1965 | Shomaker | 235/61 A |
| 3,333,085 | 7/1967 | Colalillo | 219/489 X |

Primary Examiner—Richard B. Wilkinson
Assistant Examiner—Stanley A. Wal
Attorney—Auzville Jackson, Jr., Robert L. Marben and Candor, Candor & Tassone

[57] ABSTRACT

A computer-controller device for controlling the cooking operation of a cooking apparatus, the device having a weight input means for setting the device at a weight setting corresponding to the weight of a meat item to be cooked by the apparatus. The device has a meat doneness input means for setting the device at a doneness setting for a particular meat item. The device has means operatively associated with the input means to cause the cooking apparatus to cook the meat item at a predetermined and substantially constant cooking temperature for a period of time computed in accordance with a cooking time formula based on at least the weight setting of the device and for causing a subsequent reduction in the cooking temperature at a particular point in the time period as computed in accordance with the doneness setting of the device whereby the meat item will be substantially at the doneness of the doneness setting at the termination of the computed cooking time period.

14 Claims, 10 Drawing Figures

Patented May 1, 1973

INVENTOR.
JAMES R. WILLSON

BY
Cauder, Cauder & Tarone
HIS ATTORNEYS

INVENTOR.
JAMES R. WILLSON

BY

HIS ATTORNEYS

INVENTOR.
JAMES R. WILLSON

INVENTOR.
JAMES R. WILLSON
BY
Candor, Candor & Tassone
HIS ATTORNEYS

COOKING COMPUTER

This application is a continuation-in-part application of its copending parent patent application, Ser. No. 47,345, filed June 18, 1970, now abandoned and assigned to the same assignee to whom this application is assigned.

This invention relates to computer cooking means and to a cooking computer method.

This invention provides a computer device either for use separate from a cooking apparatus or in combination with a cooking apparatus for simplifying the cooking operation for the housewife or the like in a most accurate manner so that the particular item being cooked will be correctly and automatically cooked by the cooking apparatus. For example, such device can be utilized for assisting in the cooking of a meat item in an oven of a cooking apparatus as will be apparent hereinafter.

In the past, many systems have been provided in an attempt to help the housewife or cook in roasting meat so that the same will be of a desired doneness at a time when the housewife or the like desires to serve such food.

One such system comprises a meat probe system wherein a meat probe is inserted in the meat and controls the cooking thereof by sensed internal temperature of the meat item. However, such meat probe system has not become popular for a number of reasons, such as a lack of understanding by the housewife, problems in cleaning and maintaining the temperature sensing probe and component reliability. Also, such systems are subject to major errors depending upon how the probe is inserted in the meat as well as the size and bone content of the meat. It is believed that the major reason why the meat probe systems are not well accepted is that they keep the housewife "in the dark" about when her dinner will be finished because when the housewife starts to cook her dinner, she will not know when it will be finished.

Other cooking systems comprise "cook and hold" timer systems wherein the housewife or the like can put the food in the oven which then begins to immediately cook the same and when the food has been cooked, will automatically lower the temperature of the oven to a warmth retaining and non-cooking temperature to maintain the cooked food at a palatable temperature and condition so that the food can be served any time after the cooking operation, up to several hours as desired, without overcooking of the food. While the housewife will know exactly when her meal will be completed with the "cook and hold" cooking systems, the problem with this type of system is that it performs no better than the information the housewife puts into the controls of the cooking apparatus. In particular, the meat cooking recipes available to the housewife are not accurate because they must be kept in an oversimplified form. It is not practical to expect the housewife to be able to handle a log or a square root function in order to cook a meal nor is it practical to expect her to deal with more than one or two meat roasting variables.

One of the major problems in the development of any effective meat roasting system is that of being able to reduce oven temperature at the proper time to allow the stored heat in the meat item to dissipate through the meat and still have the meat reach the desired end result or doneness. The oven "cut back" point will vary with the oven, the type of meat and more particularly to the desired end result or doneness. The housewife could not be expected to know the proper time to reduce oven temperature or to know how long to wait after oven temperature is reduced before removing the food.

In order to solve the aforementioned problems of prior known cooking control systems, one embodiment of this invention provides an ideal system that comprises a computer that considers all of the important meat roasting variables. All the housewife has to do is to feed readily available information into the computer. This information can be retained for reference and the computer can give an immediate indication of the required roasting time. The computer can then program the cooking apparatus through the proper sequence to give the desired end result or cooking doneness. This sequence includes the reducing of the oven temperature at the proper point and allowing the proper wait period after oven temperature reduction. At the end of the roasting operation the oven will be on "hold" so that the housewife can remove the cooked food at this point or allow it to remain in the oven without further cooking taking place so as to be served at a later time. During the entire cooking operation, the computer provides a continuous "readout" of the time remaining before the cooking operation is completed.

One such computer-controller device of this invention for controlling the cooking operation of a cooking apparatus has a weight input means for setting the device at a weight setting corresponding to the weight of a particular meat item to be cooked by the apparatus. The computer-controller device also has a meat doneness input means for setting the device at a doneness setting for the particular meat item. The computer-controller device has means operatively associated with both input means to cause the cooking apparatus to cook the meat item at a predetermined and substantially constant cooking temperature for a period of time computed in accordance with a cooking time formula based on at least the weight setting of the device and for causing an authomatic reduction in the cooking temperature at a particular point in the computed time period as computed in accordance with the doneness setting of the device whereby the meat item will be substantially at the doneness of the doneness setting at the termination of the computed cooking time period. Such computer-controller device has a time indication means which continuously operates during the cooking operation to indicate how much time is remaining before the termination of the computed cooking time period.

The cooking formula for this invention applies equally well to gaseous fuel burning ovens and to electrically heated ovens by merely changing a constant in the formula as will be apparent hereinafter. Further, by making a change in another constant of the formula, a particular manufactureer's cooking apparatus in one of the two main groups of cooking apparatus (electrical or gas), the cooking formula of this invention will be tailored for that particular cooking apparatus to produce optimum cooking results as will be apparent hereinafter.

Accordingly, it is an object of this invention to provide an improved computer device for a cooking apparatus or the like, the device having one or more of the novel features set forth above or hereinafter shown or described.

Another object of this invention is to provide an improved computer-controller device for controlling the cooking operation of a cooking apparatus, the computer-controller device of this invention having one or more of the novel features set forth above or hereinafter shown or described.

Another object of this invention is to provide an improved cooking apparatus having one or more of the novel features set forth above or hereinafter shown or described.

Another object of this invention is to provide an improved method for cooking a meat item or the like, the method of this invention having one or more of the novel features set forth above or hereinafter shown or described.

Another object of this invention is to provide an improved method for computing a cooking time period for a particular meat item, the method of this invention having one or more of the novel features set forth above or hereinafter shown or described.

Other objects, uses and advantages of this invention are apparent from a reading of this description which proceeds with reference to the accompanying drawings forming a part thereof and wherein.

Figure 1:
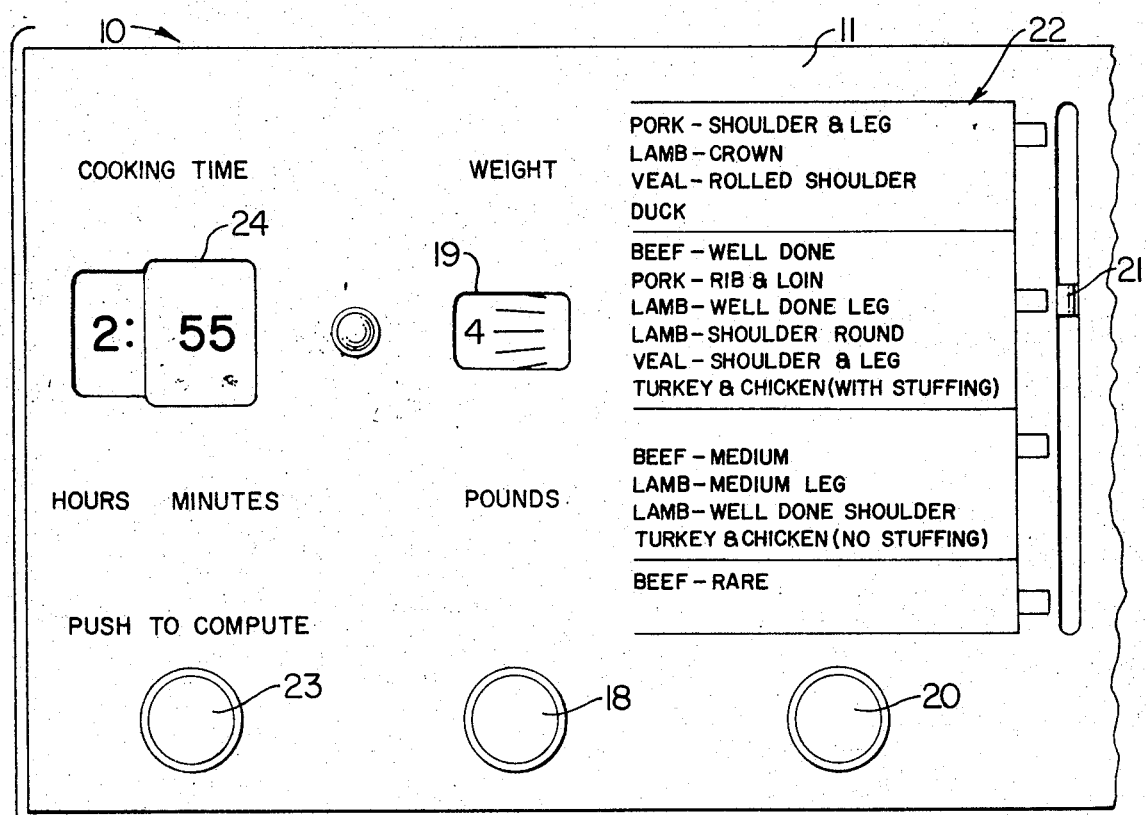
FIG. 1 is a front view of a control panel of a cooking apparatus of this invention.
Figure 1:
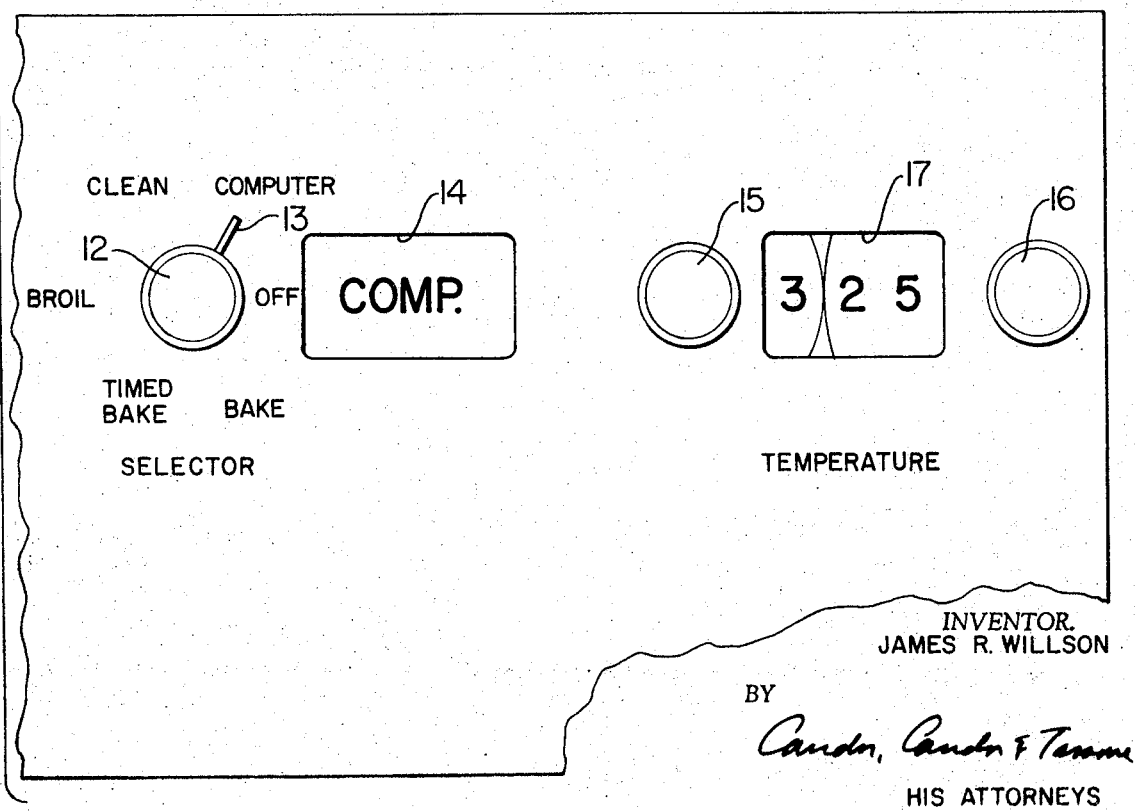

While the various features of this invention are hereinafter described and illustrated as being particularly adapted to provide computer cooking means for roasting meat in an oven of a cooking apparatus, it is to be understood that the various features of this invention can be utilized singly or in any combination thereof to provide computer cooking means for other food items and for other parts of the cooking apparatus and the like, as desired.

Therefore, this invention is not to be limited to only the embodiments illustrated in the drawings, because the drawings are merely utilized to illustrate some of the wide variety of uses of this invention.

Before describing the particular structure of this invention, it is deemed necessary to fully set forth the cooking time period formula of this invention for gas and electric cooking ovens and the reasons why such particular cooking time formula is being utilized to accomplish the features of this invention.

In particular, one embodiment of the computer of this invention for gaseous fuel burning ovens computes the cooking time period in minutes from the start to completion or zero time when the food can be removed from the cooking apparatus as equalling seventy times the square root of the weight of the meat item plus an amount defined in accordance with the meat type and desired end result or doneness, such results including the temperature reduction or cut back time previously described and hereinafter more fully described with the oven cooking temperature being 325°F.

In such formula, it can be seen that only two input variables are being utilized, namely, the starting weight of the meat and an input factor that would vary with meat type and desired end result or doneness, such formula being written as time (in minutes) from start to completion as follows: $T = 70\sqrt{W} + K$. In such formula $W$ equals starting weight of the meat and $K$ equals an input factor that would vary with meat type and desired end result or doneness. $K$ factors for roast meat have been found as follows:

Rare, K equals plus 15;
Medium, K equals plus 20 and
Well, K equals plus 52.

These relationships have been established for a 325°F. roasting temperature and such formula has been confirmed by performing many confirming tests.

While such values for the $K$ factor have been found to apply generally to all manufacturers' ovens of the fuel burning type, it has been found that the $K$ factor can be changed slightly for each manufacturer so as to more positively tailor the cooking formula of this invention to a particular manufacturer's cooking device.

For electric ovens, the cooking formula of this invention merely has the first constant thereof changed from seventy to forty whereby the formula is:

$$T = 40\sqrt{W} + K.$$

It has been found necessary to allow longer times for the rare settings for cooking meat because rare meats have a greater temperature gradient at the point of temperature reduction in the oven and they will have a greater temperature climb over a longer period of time.

One of the reasons that the above formula performs so well is that it is recognized that it is possible to get rare meat results by reducing oven temperature in an early enough stage so that given sufficient time in a 175°F. oven, the meat will drift up to the desired 135° to 140°F. in temperature at the termination of the computed time period. It is not necessary to change the 175°F. "hold" temperature for operations other than rare as these operations require less precision.

Figure 4:
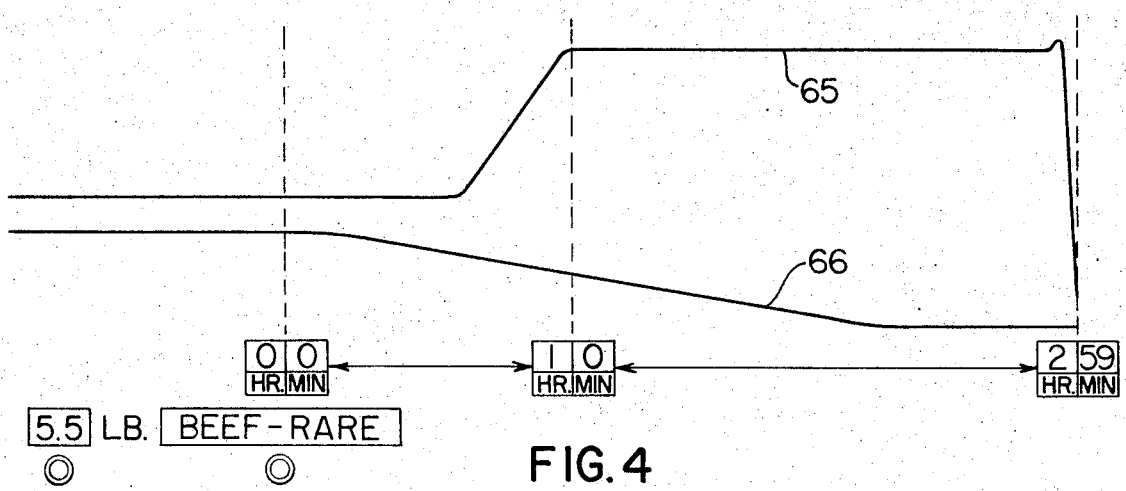
FIG. 4 is a graph illustrating the computed cooking operations of the cooking apparatus of FIG. 1 with the control means set for a particular cooking operation.
Figure 5:
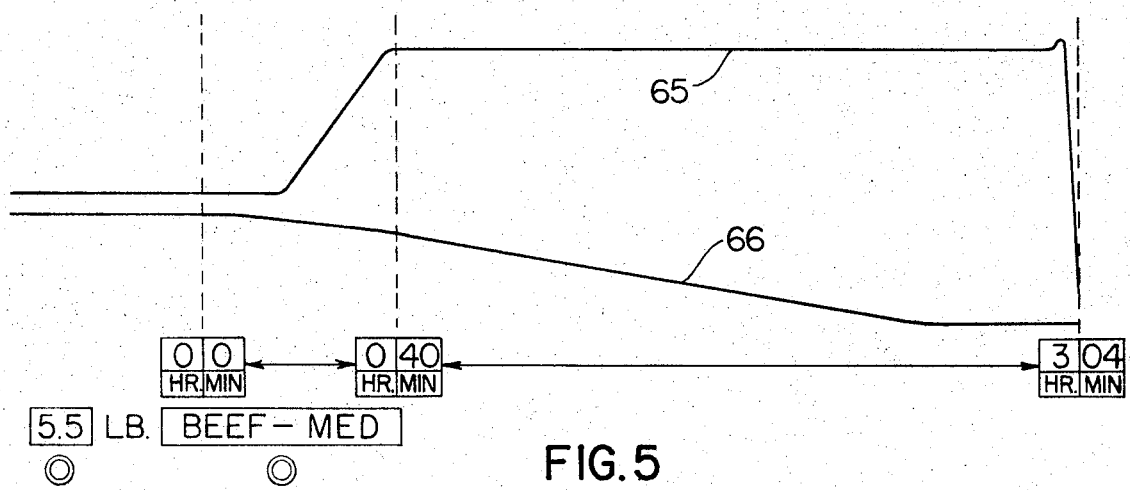
FIG. 5 is a view similar to FIG. 4 and illustrates the computed cooking operations for another setting of the apparatus of FIGS. 1 and 2.
Figure 6:
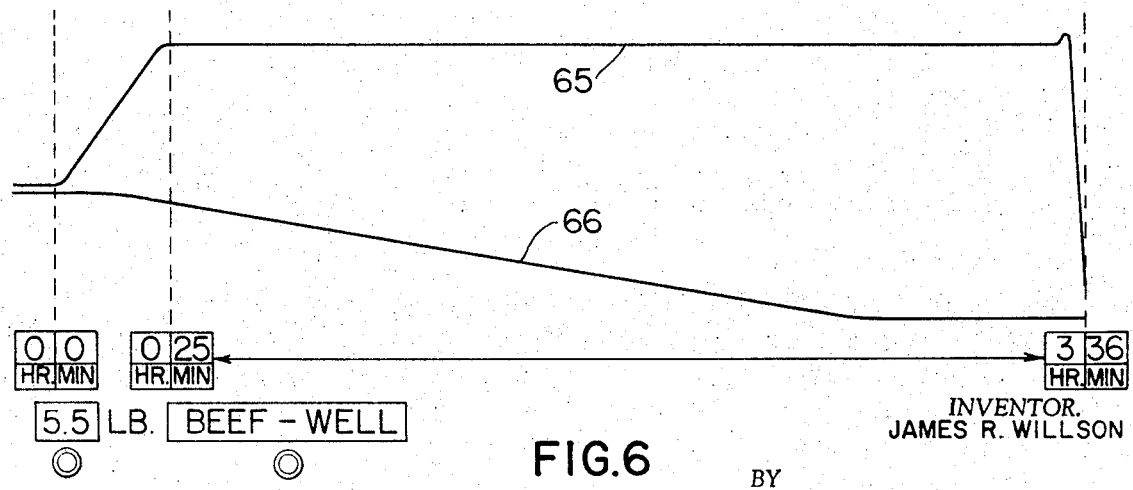
FIG. 6 is a view similar to FIG. 4 and illustrates the computed cooking operations for another setting of the apparatus of FIGS. 1 and 2.

Another reason why the above formula performs so well is that final meat roasting with the system of this invention is done during and after oven cool down to the 175°F. hold temperature as represented by FIGS. 4–6 in a manner hereinafter described. This method of roasting allows stored heat in the meat item to dissipate through the meat item or roast and this appears to compensate for the different thermal conductivities and specific heat found in different meat types, bone and fat.

In the formulas of this invention, the weight of the meat item is independent of the desired end result or doneness. This makes it possible to have a minimum number of computer setting positions for the housewife or the like by using one dial for weight input and another dial for the other meat variables. It also makes it possible to have intermediate dial settings, such as half way between rare and medium, etc. The features of this invention have demonstrated that roasting meat in the manner of this invention gives consistent results that cannot be obtained by other methods, including methods that measure the internal meat temperature. Testing of this invention has illustrated that the same relationship or cooking time formula will perform equally well with different types of meat, such as pork, lamb, and different types of beef. The relationship or formula is not significantly influenced by the shape of the meat or fat and/or bone content of the meat.

Thus, by utilizing the above cooking time formula, it has been found according to the teachings of this invention that the computerized cooking can be readily and simply accomplished by the housewife or the like merely determining the weight of the meat item and the desired degree of doneness for the particular meat item. With these two variables, the housewife can insert the two inputs into a computer device of this invention which will compute from such information and on the basis of the aforementioned formula the required cooking time period that that meat item must be cooked in the oven with the oven set at 325°F., such computer device further having means for providing an output that signifies an exact point during the computed cooking time period that the oven is to have its temperature effect reduced to its warmth retaining and non-cooking temperature effect so that the doneness of the meat will be at the doneness setting of the computer device when the cooking time period reaches or elapses to zero.

Such computer device of this invention can be utilized in combination with a cooking apparatus to automatically start the cooking operation thereof and cause the automatic temperature reduction previously described and thereafter maintain the temperature in the oven at the warmth retaining and non-cooking "hold" temperature whereby all that the housewife need do is to insert the two previously described cooking variables into the controls and the meat will then be automatically and accurately cooked to the desired degree of doneness thereof.

Accordingly, reference is now made to FIG. 1 of the drawings wherein an improved cooking apparatus of this invention is generally indicated by the reference numeral 10 with only the control panel means 11 thereof being illustrated as it is considered obvious that any desired type of cooking apparatus can be utilized with the control panel 11 of this invention as such control panel 11 can automatically set the oven temperature control device at 325°F. or have the same manually set and will thereafter automatically cause the temperature control device to reduce to a warmth retaining and non-cooking temperature setting effect thereof when an output is provided by the control panel means 11. Such oven temperature cutback is provided in prior known oven controls after the occurrence of an event, such as a timed baking operation or the like whereby the temperature controller for the cooking apparatus will maintain a warmth retaining and non-cooking temperature, such as 175°F., until the housewife or the like turns the oven controls to the "off" position thereof.

For example, the temperature control means and cooking apparatus can be of the type set forth in the U.S. Pat. No. 3,341,119, wherein the control device can be set at the cooking temperature of 325°F. and will have the effective temperature setting thereof automatically reduced to a non-cooking and warmth retaining temperature when a heat motor means thereof is energized by having an electrical current passed to the heat motor means upon the occurrence of an event, which event, according to the teachings of this invention, is provided by the computer-controller means 11 requiring a reduction in the cooking temperature during the previously described computed cooking time period.

The control panel means 11 includes a selector knob 12 having pointer means 13 for setting the control panel 11 in an "off" position thereof, a conventional "bake" position thereof, a "timed bake" position thereof, a conventional "broil" position thereof, an "oven-clean" position thereof and in a "computer" position thereof for practicing the features of this invention, the control panel 11 also being provided with window means 14 for visually indicating the position of the selector knob 12. In addition, the control panel 11 has suitable selector knobs 15 and 16 for setting the conventional oven thermostatic control means thereof at a desired cooking temperature setting, such setting being viewable through window means 17 of the control panel 11. The computer portion of the control panel 11 is shown in the upper part of FIG. 1 and includes a selector knob or input means 18 for inserting the weight factor of the meat item to be cooked by the apparatus 10, the selector knob 18 having its setting viewable through suitable window means 19 in the control panel 11. Similarly, the other input variable of the computer device 11 of this invention is provided by a selector knob 20 for inserting the desired type of meat and doneness or end result thereof into the computer portion of the control panel 11, the selector knob 20 controlling an indicator 21 adapted to be positioned adjacent the meat type and desired end result information carried in a block legend 22 on the control panel 11.

The computer portion of the control panel 11 includes a push button means or actuator 23 which when actuated by pushing inwardly on the same will cause the computer portion of the control panel 11 to compute from the setting of the control knobs 18 and 20 the required cooking time period that the selected weight and meat type doneness will require the meat item to be cooked by the apparatus 10 if the same is to be cooked by the cooking formula means of this invention, such cooking time period being automatically provided at window means 24 of the control panel 11 once the computer or actuator button 23 has been actuated.

Such computing of the cooking time period by the control panel 11 can take place while the selector knob 12 is in the "off" position thereof whereby once the housewife has obtained the cooking time information at the window 24 of the control panel 11 and determines that such cooking time period will be terminated sufficiently in advance of the desired serving time that for that particular meat item the housewife places the meat item in the oven and manually sets the cooking temperature at 325°F. by the selector knobs 15 and 16 (if the control panel 11 will not automatically set the same at 325°F. when the selector knob 12 is moved to the "computer" position illustrated in FIG. 1). Thereafter, the housewife sets the selector knob 12 at the "computer" position thereof whereby the control panel 11 will cause the meat item to be cooked to the desired degree of doneness thereof and thereafter maintain the cooked meat item at a warmth retaining and non-cooking "hold" temperature once the cooking time period viewable at window 24 has elapsed so that any time after such elapsed cooking time period, the housewife or the like can remove the cooked food for serving of the same.

The control panel means 11 of this invention is so constructed and arranged in a manner hereinafter set forth that once the cooking operation begins by the selector knob 12 being disposed in the "computer" position thereof as illustrated in FIG. 1, the cooking time at the window 24 provides a readout of elapsing cooking time so that during the cooking operation the window means 24 will continuously indicate the amount of time remaining for the oven to be cooking the meat item whereby when the time at the window 24 reaches zero, the food can be removed from the oven or remain therein until any desired time, with the housewife fully understanding that until the time indicated at the window 24 reaches zero, the food has not been cooked to the desired degree of doneness.

Figure 3:
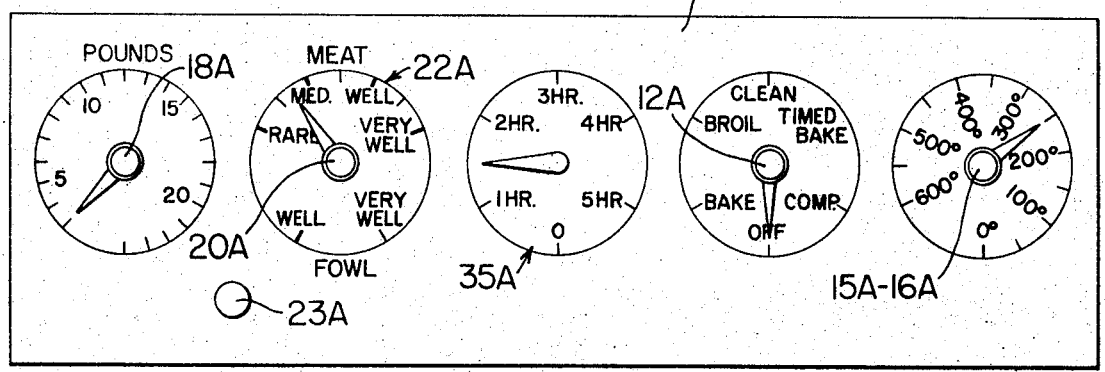
FIG. 3 is a front view of another control panel for use with the computer-controller device of FIG. 2.

While the particular indication means for the selector means 20 of the control panel 11 is provided in a legend block form 22, such K factor input for the computer means of this invention can be arranged in the manner provided by the control panel 11A of FIG. 3 wherein like parts are indicated by like reference numerals followed by the reference letter A.

As illustrated in FIG. 3, the selector knob 20A merely provides one range of K factors for all types of meat such as pork, lamb and beef roasts in regard to the desired end result or doneness thereof whereby the selector means 20A need only provide special settings for fowl, meat loaf and perhaps some other non-roast meat types.

Nevertheless, it can be seen that in both embodiments 11 and 11A, all the housewife needs to insert in the way of information into the particular control panel is the weight of the meat item and the desired degree of doneness thereof for the particular meat type whereby the computer device of this invention will automatically cook such food according to the cooking formula of this invention as previously described.

Figure 2:
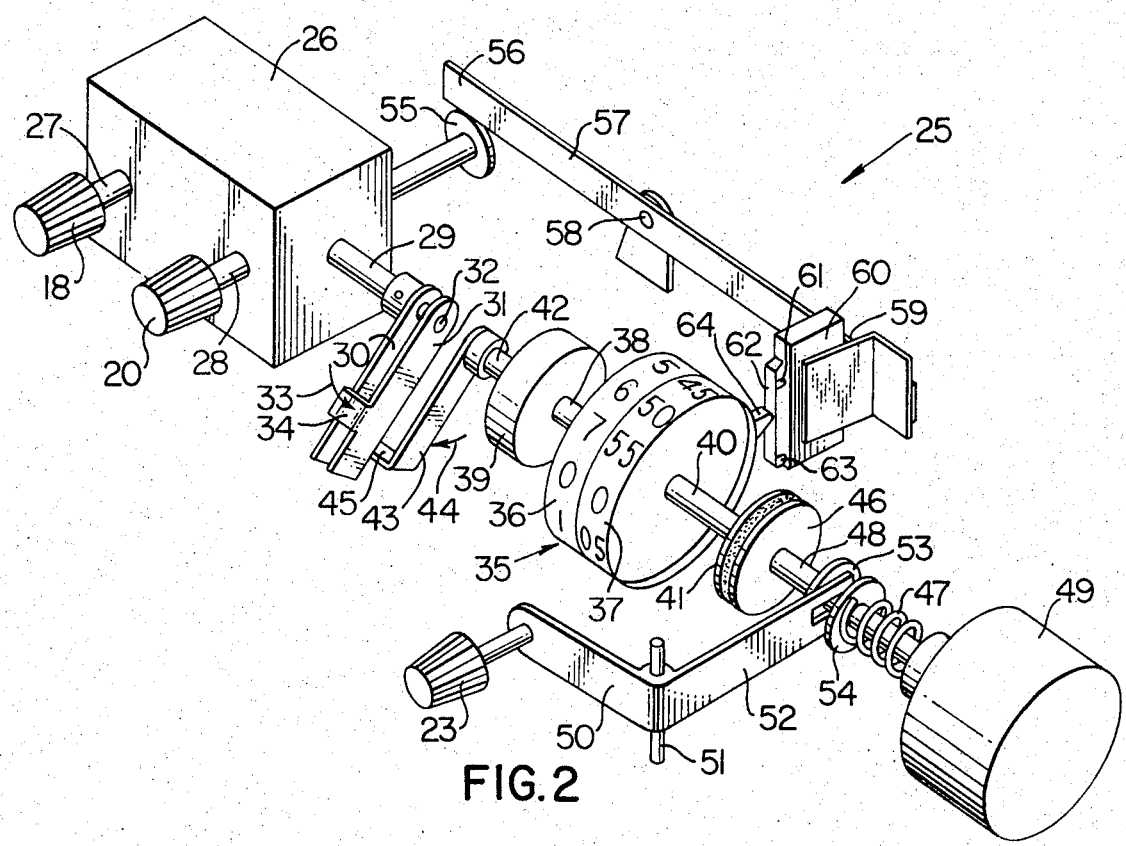
FIG. 2 is a schematic perspective view of one embodiment of the computer-controller device of this invention.

Referring now to FIG. 2, the structure of the computer portion of the control panel 11 is generally indicated by the reference numeral 25 and comprises a mechanical adding mechanism 26 of conventional form whereby when the selector knob 18 is rotated by the housewife to insert a weight setting that the housewife reads as pounds and fractions of a pound for a desired meat item, the shaft means 27 of the selector knob 18 translates this rotational movement into the results of 70 times the square root of the weight of the meat item before this input enters the adding mechanism 26. The other meat variables, such as type, size and desired doneness are inserted into the computer mechanism 25 by means of the selector knob 20 previously described. The housewife reads this input variable directly as provided by the legend 22 on the control panel 11 or the legend 22A on the control panel 11A and such rotation of the knob 20 is translated by the control shaft 28 into the previously described factor K before it enters the adding mechanism 26. The two translated inputs from knob settings 18 and 20 are added immediately in the mechanical adding mechanism 26 whereby the adding mechanism 26 positions its output shaft 29 proportional to the sum of the inputs 18 and 20 as provided by the previously described formula, i.e., 70 times the square root of the weight of the meat item plus the K factor based on meat type and desired degree of cooking doneness thereof for gas burning cooking apparatus and 40 times the square root of the weight of the meat item plus the K factor based on meat type and desired degree of cooking doneness thereof.

The output shaft 29 of the adding mechanism 26 carries an arm 30 that rotates in unison therewith. In addition, an output follower or arm 31 is rotatably carried on a pin extension 32 of the output shaft 29 but is normally spring loaded by spring force means 33 in a counterclockwise direction in FIG. 2 so that a tang or arm 34 thereof bears against the output arm 30 as illustrated.

The time registry means for viewing at the window means 24 of the control panel 11 is generally indicated by the reference numeral 35 and comprises two cylinders 36 and 37 respectively for indicating hours and minutes through the rotational position thereof, the hour cylinder 36 having a shaft means 38 connected to suitable gearing means 39 while the minute cylinder 37 has suitable shaft means 40 interconnected to a clutch disc means 41. The timer discs 37 and 36 are operatively interconnected together in a suitable manner so that rotation of the shaft 40 in a manner hereinafter described will cause a run down in the indicated time with the hour cylinder 36 rotating one increment for each 360° of rotation of the minute disc 37 in a conventional manner.

The gearing 39 has a shaft 42 provided with an output follower or arm 43 normally urged in a time increase clockwise direction in FIG. 2 by a spring force means 44 so that a tang 45 of the follower 43 normally bears against the follower 31 with the spring force 33 being greater than the spring force 44 for a purpose hereinafter described.

However, the time register mechanism 35 is normally held from rotation thereof from the zero indicating position thereof by a clutch plate 46 urged into clutching engagement with the clutch plate 41 by a compression spring 47, the clutch plate 46 being carried by a shaft means 48 being held from rotational movement thereof by a timer motor 49 which is normally in an "off" condition and will not rotate the shaft 48 until the selector knob 12 of the control panel 11 is set in the "computer" position thereof as will be apparent hereinafter.

The computer knob 23 of the control panel 11 operates an L-shaped lever 50 adapted to pivot about a vertically disposed pivot pin 51 and control the axial position of the shaft 48 as the arm 52 thereof is operatively interconnected to the shaft 48 at a point between two discs 53 and 54 fixed on the shaft 48. Thus, inward pushing of the compute button 23 causes the lever 50 to pivot on the pivot pin 51 so that the arm 52 thereof moves to the right in FIG. 2 in opposition to the force of the compression spring 47 and thereby frees the clutch disc 46 from the clutch disc 41 so that the follower 43 of the time registry means 35 can move in a clockwise direction to bear against the follower 31 of the computer output 29 should the same be set in a timer period direction. In this manner, movement of the shaft 42 causes the time register mechanism 35 to increase from zero to a time period corresponding to rotation of the shaft 42. Thereafter, upon release of the compute button 23, reengagement of the clutch disc 46 with the clutch disc 41 by the compression spring 47 permits the time registry means 35 to be held in the time setting position thereof provided by the movement of the follower 43 thereof whereby the time registry means 35 is subsequently adapted to be run back to a zero position thereof when the timer motor 49 is subsequently energized to drive the shaft 48 and, through the engaged clutch discs 46 and 41, the timer shaft 40 for rotating the timer mechanism 35 back to the zero position thereof during a cooking operation.

The input shaft 28 of the selector means 20 also determines the rotational position of a cam 55 that acts against one end 56 of a lever 57 being pivotally mounted at 58 intermediate its end 56 and 59. The other end 59 of the lever 57 carries an electrical switch 60 having an operating plunger 61 which will complete an electrical circuit through the switch mechanism 60 when the plunger 61 is depressed by a lever 62 pivotally mounted to the switch 60 at point 63. The timer register 35 has a tang 64 that moves therewith and is engageable with the lever 62 for the switch means 60 so that as the time register 35 is moving toward the zero or rundown position thereof, the tang 64 will engage the lever 62 and cause the same to depress the plunger 61 and thereby actuate the electrical switch 60 at a particular time during a cooking time period to cause an oven temperature reduction through the operation of a heat motor or the like of the main thermostatic control means for the oven in a manner similar to the heat motor arrangement fully described in the aforementioned U. S. Pat. No. 3,341,119.

Therefore, it can be seen that as the selector knob 20 is selecting a desired meat type and desired end result or doneness thereof that is being added in the adding mechanism 26, the shaft 28 is also positioning the cam 55 and, thus, the switch 60 relative to the time register 35 so that different "cut back" or oven temperature reduction times will be provided by the computer 25 in accordance with the selected K factor of the aforementioned cooking formula.

The operation of the computer part 25 of this invention as utilized in the cooking apparatus 10 of FIG. 1 will now be described with it being understood that the following example as well as for the other embodiments of this invention, is for a gas burning cooking apparatus and that such example would apply equally well to an electrical oven if the cooking formula is changed in the manner previously described.

Assuming that the housewife or the like desires to cook a 5½ pound beef roast, with the desired degree of doneness thereof being rare, the housewife turns the selector knob 18 to a position which indicates 5½ pounds and turns the selector knob 20 to a position that indicates "beef-rare" in the manner illustrated in FIG. 4. With the selector knob 12 disposed in an "off" position, such rotation of the selector knobs 18 and 20 provides an addition of 70 times the square root of 5.5 plus 15 that is translated into rotational movement of the output shaft 29 of the adding mechanism 26 in a clockwise direction in FIG. 2 to a position thereof away from the follower 43 of the time register 35 because the time register is being held in a zero position by the non-operating clutch shaft 48.

However, when the housewife or the like pushes in on the compute button 23, to disengage the clutch disc 46 from the clutch disc 41, the spring means 44 acting on the time register follower 43 causes the same to rotate the shaft 42 in a clockwise direction until the tang 45 engages against the follower 31 whereby such movement of the shaft 42 sets the time register 35 at the cooking time period as produced by the formula of this invention which in the example given in FIG. 4 is 2 hours and 59 minutes for a 5.5 pound beef roast which is to be cooked to a doneness of rare.

Such rotation of the selector knob 20 for a rare setting for roast beef also sets the cam 55 in such a position that the switch 60 will cause a cutback in the oven temperature at a point of 1 hour from the termination of the 2 hours and 59 minutes cooking time period. However, if the selector knob 20 had been set for medium instead of rare, the switch 60 would be positioned to cause a cutback 40 minutes before zero time as set forth in FIG. 5 and if the selector knob 20 had been set for a doneness of well, the switch 60 would have been set for causing an oven temperature cutback 25 minutes before zero time as illustrated in FIG. 6.

When the housewife releases the push button 23, the spring 47 again places the clutch plate 46 into clutching engagement with the clutch plate 41 whereby the timer register 35 remains at the indicating 2 hours and 59 minutes position illustrated in FIG. 4.

Thereafter, the housewife or the like places the 5.5 pound roast in the oven and sets the temperature oven control at 325°F. as illustrated in FIG. 1 if the selector knob 12 when set in a "computer" position thereof does not automatically set the oven for 325°F.

In any event, when the control knob 12 is subsequently set in the "computer" position thereof as illustrated in FIG. 1, the cooking apparatus 10 begins to automatically cook the food by the selector knob 12 turning on the oven so that the thermostatic means will begin to increase the oven temperature to 325°F. with the oven temperature being represented by the line 65 in FIG. 4. The internal temperature of the meat in the oven is represented by the line 66 in FIG. 4 whereby it can be seen that as the oven reaches 325°F., the oven temperature remains level at 325°F. for approximately 1 hour and 59 minutes while the temperature of the meat 66 begins to climb during such cooking time period. When the selector 12 was first set in its "computer" position, the timer motor 49 was energized so that the same begins to drive the time register 35 back toward zero through the closed clutch means 46, 41.

Thus, as the meat is being roasted, the housewife is given visual indication of the amount of time remaining that the oven must continue to cook the food before it can be served.

During such elapsing of the cooking time period, the tang 64 of the time register 35 actuates the switch 60 when one hour of cooking time remains as illustrated in FIG. 4 to cause the oven to reduce its temperature to and maintain the temperature at 175°F. as illustrated in FIG. 4.

However, the temperature of the meat continues to rise as illustrated by the line 66 to about 135° to 145°F. at the end or zero time indicated position illustrated in FIG. 4 whereby the meat will remain at a rare doneness thereof even though the meat is not removed from the oven exactly at the return of a zero setting of the time register means 35 since the 175°F. "hold" temperature of the oven will maintain the meat in a rare condition at such warmth retaining and non-cooking temperature up to several hours after the time register 35 reaches the zero position thereof.

Thus, it can be seen that the 5.5 pound roast is automatically cooked by the control device 10 of this invention in a manner that has been found to be more accurate than other automatic cooking systems.

Should the previously described cooking operation take place with the selector knob 20 set for a medium or well done end result as illustrated respectively in FIGS. 5 and 6, it can be seen how the oven temperature 65 and meat temperature 66 are changed during the terminal portion of the cooking operation so as to provide the desired degree of doneness thereof when the time register 35 reaches its zero position, the initial setting of the time register 35 for a medium doneness providing a complete cooking time period of 3 hours and 4 minutes as illustrated in FIG. 5 and for a well doneness setting providing a 3 hour and 36 minutes computed cooking time period as illustrated in FIG. 6. Such medium and well done settings are also based on the cooking time formula previously described.

While the timer motor 49 for the computer portion 25 of this invention has been previously described as being energized through the range function selector 12 being disposed in its "computer" position, the timer motor 49 could run continuously and operate a time of day clock. Then the time register 35 would be driven by the timer motor 49 whenever the register 35 was away from its zero position and the mechanism or actuator 23 was not depressed. However, at the zero position of the time register 35, the time register 35 would move against a mechanical stop and the motor 49 would continue to operate while slipping would occur at the clutch plates 46, 41. An alternative arrangement would be to have the time register 35 trip a release of the clutch mechanism 41, 46 when the register 35 reached its zero position. The clutch means 46, 41 would then be relatched together the next time the actuator or push button 23 was depressed.

The computer portion 25 of the cooking apparatus 10 of this invention has a provision for the housewife to change her mind after the knobs 18 and 20 have been set and the compute button 23 has been depressed whereby the follower 43 has its tang 45 against the output follower 31 and the time register 35 is indicating a computed cooking time period. The output shaft 29 of the adding mechanism 26 can thereafter be moved to a higher time setting position thereof without interfering with the time register follower 43 because the follower 31 and its carrier arm 30 would be further moved in a clockwise direction in FIG. 2 away from the follower 43 because the clutch plate 46 is holding the time register 35 from following movement thereof so that a subsequent depressing of the button 23 will cause the time register 35 to provide the increased time setting thereof by its follower 43 being removed in a clockwise direction by the spring means 44. A lower time setting by the selector means 18 and 20 will cause the output shaft 29 to be rotated in a counterclockwise direction and the output arm 30 thereof will move away from the follower arm 31 which remains in engagement with the follower arm 43 of the time register 35. Then when the push button 23 is depressed to move the clutch plate 46 away from the clutch plate 41, the spring force 33 on the follower 31 is greater than the spring force 44 on the follower 43 of the time register 35 whereby the follower 31 will also move in a counterclockwise direction until the tang 34 thereof is against the arm 30. Thus, the follower 31 has thus repositioned the time register follower 43 at a lower time period setting thereof.

Another means of obtaining readjustment of the computer 25 is to make items 31 and 30 of a solid piece and provide for movement to a lower time setting by allowing the follower 43 and the time register 35 to move to a lower time setting thereof by slipping the clutch means 46 and 41.

The time register 35 of the computer 25 can have a means for manual adjustment thereof, such as by turning the knob 23 for adjusting the time register 35, if desired.

Of course, it is possible to arrange the computer device 25 in many different ways without varying the features of this invention.

Thus, it can be seen that the previously described computer 25 in combination with the cooking apparatus 10 provides for the proper roasting time for a particular meat item before a reduction in oven temperature which will allow for the proper wait period after oven temperature is reduced. This relationship has two independent variables (weight and other meat variables) so that the relationship can be used in the computer 25 by only two inputs. This feature differs from cooking programmers wherein it is necessary to list weights with each different meat type and desired end results.

The relationship or formula of this invention also provides an effective method of assuring rare roast beef results because the cut back is early enough to allow adequate time at the 175°F. "hold" temperature.

The use of the formula of this invention utilizing square root instead of linear factors provides superior meat roasting results. In this manner, the time derived from the formula is intended for use in controlling a roasting operation and is not intended merely as a guide to indicate when other types of oven control means should be completed.

Thus, a mechanical computer is provided by this invention that operates with the previously described formula to give a time read out for required roasting time. The computer changes to a programmer to control a meat roasting sequence based upon the input information and the computer output information. This computer-control device of this invention provides a changing or decreasing to zero readout as the roasting operation progresses. The computer-controller device of this invention also varies and controls the oven temperature reduction point through its holding temperature. The computer-controller device can operate from a time of day clock motor, if desired. Other features of the computer-controller 25 of this invention will be apparent when considering the other embodiments of this invention now to be described.

The computer means 25 of FIG. 2 for the cooking apparatus 10 of FIG. 1 can be modified slightly so that the reduction of oven temperature would occur at a fixed time before the computed time period elapsed to zero. If this is done, it is necessary to retain the proper roasting times before oven temperature reduction whereby for rare meat the total minutes from start to "cut back" time would equal seventy times the square root of the weight of the roast minus 45, for medium the total minutes from start to "cut back" oven temperature would equal 70 times the square root of the weight of the roast minus 21 and for well done meat the total minutes from start to "cut back" oven temperature would equal 70 times the square root of the weight of the roast plus 27.

If 60 minutes is used as the "hold" time after oven temperature reduction, then the above times would all be increased by 60 minutes to find the time from start to zero. Rare roast beef would then be seventy times the square root of the weight of the meat plus 15 as provided by the previously described computer means 25. However, the total time for "medium" would be increased by 20 minutes and "well" would be increased by 35 minutes. Since meat roasting results depend on reducing oven temperature at the proper time and allowing enough "hold" time, with the above changes there would be no difference in "cut back" time and "hold" time would be increased so that there would be no change in the end results.

A fixed "hold" time of 45 minutes would not be unreasonable as this would keep "medium" roasting time close to the ideal, would increase "well" time to 20 minutes and would reduce rare cooking by only a slight amount.

Thus, it is possible to simplify the computer mechanism 25 of this invention by using the cooking time formula in a slightly different form. If the "well done" total time of 70 times the square root of the weight plus 52 is used for "well done", "medium" and "rare", satisfactory results can be obtained by varying the "cut back" point before zero to keep the same start to "cut back" times as used before.

For example, the total minutes of time from start to "cut back" or oven temperature reduction for rare roast beef would equal 70 times the square root of the weight plus 52 minus 94 or be equal to 70 times the square root of the weight minus 45. The total minutes from start to "cut back" of oven temperature for medium roast beef would be equal to 70 times the square root of the weight plus 52 minus 73 or equal to seventy times the square root of the weight minus 21. For well done roast beef, the total minutes from start to oven reduction would be 70 times the square root of the weight plus 52 minus 25 or equal to 70 times the square root of the weight plus 27.

Also, with a fixed "hold" time of 45 minutes from the "cutback" point to zero or end of computed cooking time for desired degree of doneness, the total minutes from start to cook to "cutback" of oven temperature for non-stuffed turkey is 70 times the square root of the weight of the meat item minus 50, for stuffed turkey it is 70 times the square root of the weight of the meat item plus zero, for stuffed and unstuffed chicken it is 70 times the square root of the weight of the meat item plus 15 and for fresh ham and pork shoulder it is 70 times the square root of the weight of the meat item plus 45.

For electric ovens it has been found that the time from "cutback" to zero position on the timer should be 60 minutes and that for having a rare setting for all meats would result in the formula for start to cook to cutback in minutes being 40 times the square root of the weight of the meat item plus 5, for medium meats the minutes would be 40 times the square root of the weight of the meat item plus 50 and for well done meats, the minutes would be forty times the square root of the meat plus 120.

Thus, it can be seen that the K factor of the cooking formula of this invention while being utilized to indicate the type of doneness for the particular meat item, the K factor is also utilized for different types of meat whereby the term "doneness" as utilized throughout this application and claims is intended to cover not only the desired degree of cooking of a particular meat item, but also covers a variable for the selection of different meat items.

Figure 7:
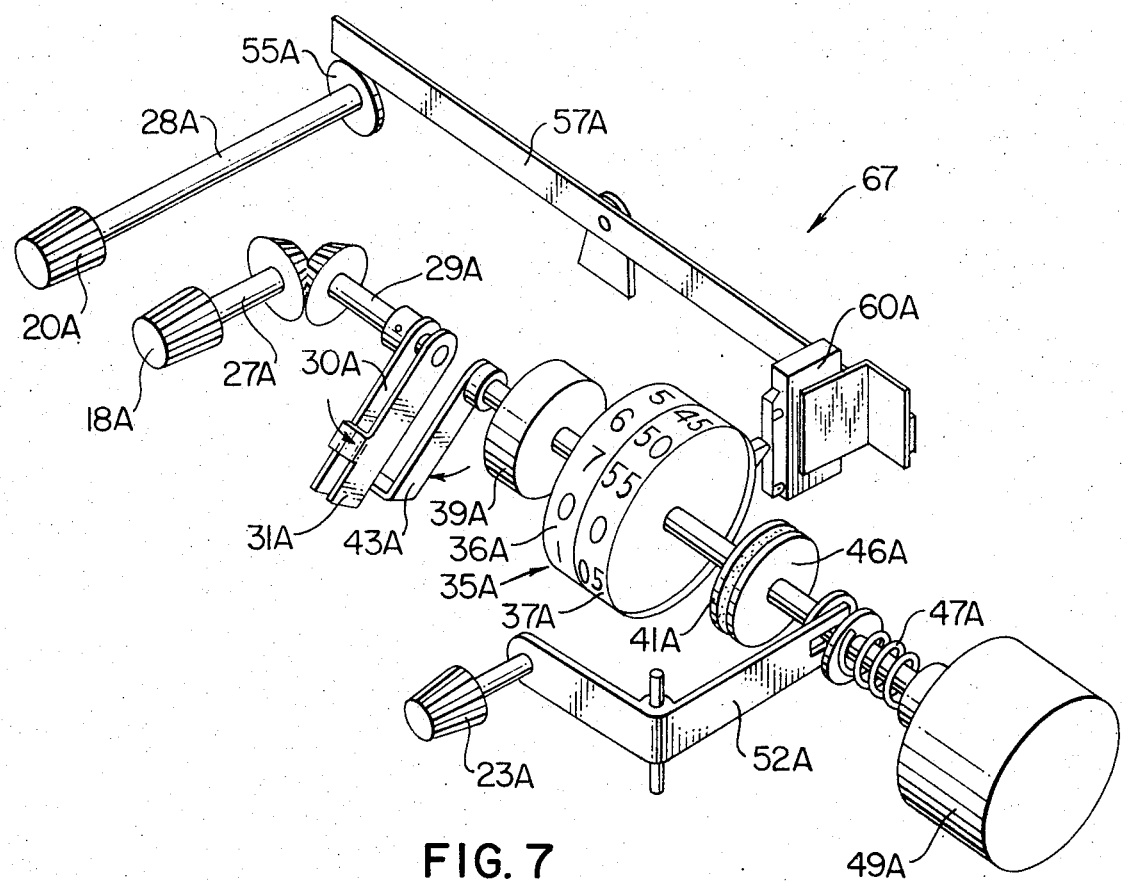
FIG. 7 is a view similar to FIG. 2 and illustrates another embodiment of the computer-controller device of this invention.

Thus, this version of the roasting formula of this invention makes it possible to simplify the computer mechanism to a form that is generally indicated by the reference numeral 67 in FIG. 7 wherein parts similar to the computer means 25 previously described are indicated by like reference numerals followed by the reference letter A.

It can be seen that the computer mechanism 67 has no means for adding the two inputs together as provided by the computer mechanism 25 previously described whereby the input information of 70 times the square root of the weight plus 52 is inserted directly into the time registry mechanism 35A by the weight input selector knob 18A having its shaft 27A geared directly to the output shaft 29A that carries the previously described follower 30A. The time register 35A will then show the same value for a given weight of meat regardless of meat type or desired end result or doneness. However, desired end results or doneness for different meat types will be obtained by subtracting from the actual roasting time (not from the time registry 35A) by means of the doneness input knob 20A having its shaft 28A adjusting the lever means 57A for the electrical switch 60A in the manner previously described. Thus, the input knob 20A subtracts by varying the time span between the end of the computed time period for the register 35A and the "cut back" or oven reduction point. When the time from "cut back" to zero is greater than 60 minutes, the "cut back" actuation could be taken from a geared output that would rotate only a percentage of the rotation of the minute indicator.

Thus, it can be seen that when the computer mechanism 67 is utilized in place of the computer mechanism 25 for the cooking apparatus 10, the resulting system will cook meat in substantially the manner previously described but it will cause an increase in the "hold" times for medium and rare results or doneness.

The computer systems previously described could use a single time readout that would register both minutes and hours or it could use the type of device illustrated in the drawings wherein there are separate readouts for hours and five minute increments with the hour readouts being in steps of 1 each time the 5 minute readout moves past 60. When information is transferred from the adding mechanism 26 to the time register 35 of FIG. 2, it is transferred through the 5 minute indicator 37 so that for a 7 hour working operation it will be necessary to rotate the 5 minute indicator 37 through seven revolutions.

However, the roasting formula and mechanism can be revised so that time information can be inserted through the hour indicator and through the minute indicator keeping the movement of both indicators to less than one revolution.

In particular, when using rare roast beef as an example of this method, the time from start to "cut back" should be 70 times the square root of the weight minus 45 and the time from start to zero should be seventy times the square root of the weight plus 15. However, one can use 60 times the square root of the weight minus 21 from start to "cut back" and 60 times the square root of the weight plus 39 from start to zero as the error is insignificant. As long as one keeps the proper "cut back" time, one can increase the "hold" time (start to zero) without effecting roasting results by utilizing sixty times the square root of the weight plus 60 from start to zero and 60 times the square root of the weight plus 60 minus 81 from start to "cut back".

Then taking the square root of weight in units and calling it X while calling the square root of 0.1 units Y, then the total time in minutes equals 60X plus 60 plus 60Y and the time in even hours is equal to 60X plus 60 divided by 60. Since X is in units, X plus 1 can be inserted into the five minute indicator 37 directly as minutes. Since Y cannot be larger than 0.9, this input will be less than one full revolution.

Figures 8, 8A:
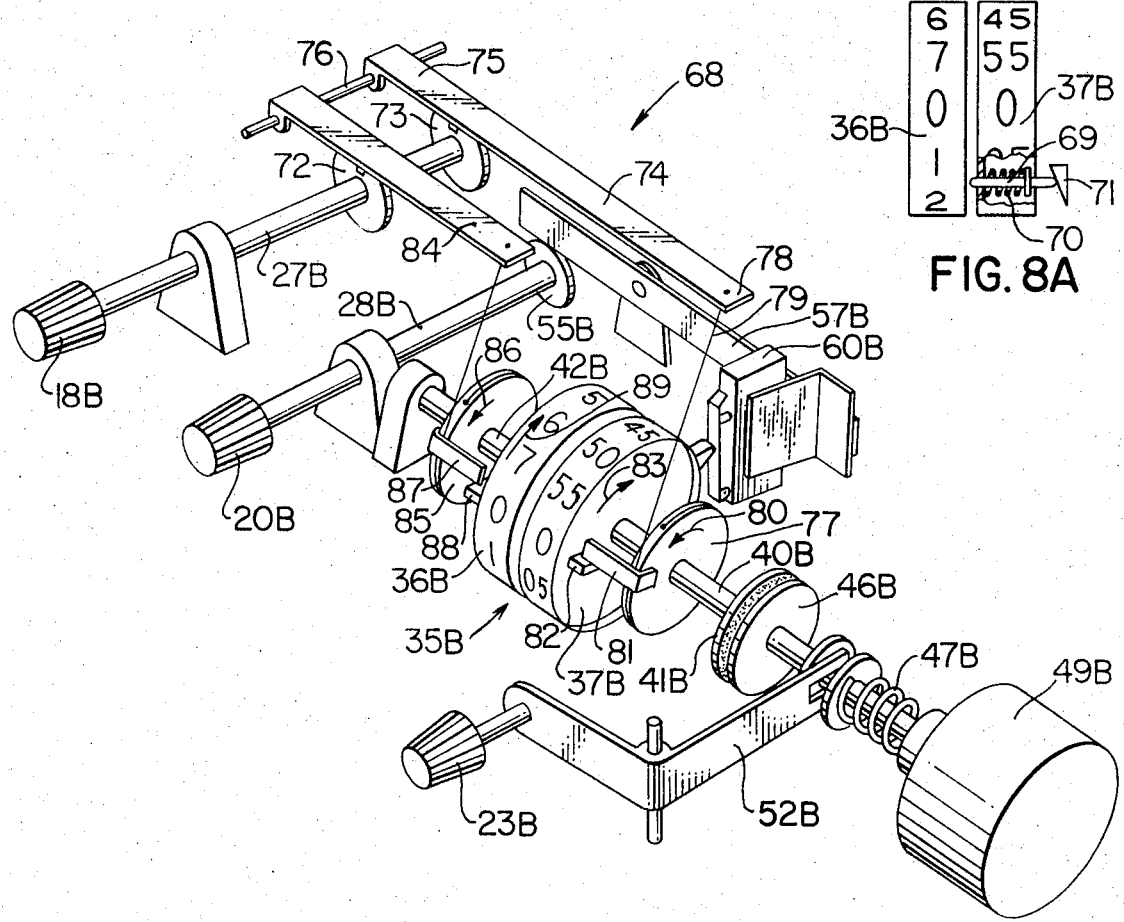
FIGS. 8 and 8A are views similar to FIG. 2 and illustrate another embodiment of the computer-controller device of this invention.

The computer mechanism 68 illustrated in FIGS. 8 and 8A will provide the above described relationship, the parts of the computer mechanism 68 being similar to the mechanism 25 and 67 will be indicated by like reference numerals followed by the reference letter B.

The desired end results or doneness knob 20B subtracts from the actual roasting time (not from the time register 35B) by varying the time span between zero and "cut back" in the same manner as provided by the selector 20A of FIG. 7.

When the push to register button or compute button 23B is in a non-depressed condition, the minute indicator 37B is driven toward zero time position through the clutch 41B, 46B and timer motor 49B. Each time the minute indicator 37B reaches 60, the minute indicator 37B causes the hour indicator 36B to index one unit. The hour indicator 36B is moved by a pin 69, FIG. 8A, carried by the minute indicator 37B and normally biased out of contact with the hour indicator 36B by a compression spring 70 except when the pin 69 engages a cam member 71. The cam member 71 is held in position by the compute mechanism 23B so that when the push button 23B is depressed, it moves the cam 71 so that it will not engage the pin 69 whereby rotation of the hour wheel 36B and rotation of the minute wheel 37B will be independent of each other. Thus, with the clutch 41B, 46B and cam 71 released, the two time registers 36B and 37B are free to move independently of each other. However, when the compute button 23B is not depressed, each complete revolution of the minute indicator 37B will cause the pin 69 to engage against the cam 71 and move the pin 69 to the left in FIG. 8A to cause indexing of the hour indicator 36B one increment.

The weight input knob 18B has two cams 72 and 73 on its shaft means 27B with the cam 72 moving in proportion to the square root of the weight in units and the cam 73 moving in proportion to the square root of 0.1 units. The cams 72 and 73 can be properly graduated in digital steps so that the units and 0.1 units would change in the proper order. Information from the cam 73 or 0.1 unit cam is transferred directly to a lever 74 having one end 75 pivotally mounted by a pivot shaft 76 to a wheel 77 that is free to rotate on the shaft 40B, the free end 78 of the lever 73 being interconnected to the wheel 77 by a string 79. A spring force 80 acts on the wheel 77 in a counterclockwise direction in FIG. 8 to keep the string 79 taut. The wheel 77 has an arm 81 that acts as a stop for an arm 82 on the five minute indicator dial 37B. The indicator dial 37B is acted on by a spring force 83 in a clockwise direction in FIG. 8 to hold the arm 82 against the arm 81 but is not strong enough to override the spring force 80 on the wheel 77.

If the time register 35B is at zero position thereof and the compute mechanism or button 23B is depressed, the minute time indicator wheel 37B will rotate in an increasing time direction until arm 82 stops against arm 81. Releasing the compute button 23B will hold the time register 35B through the clutch 41B, 46B and timer motor 49B in a manner previously described. The weight input knob 18B can then be set to a higher time setting by moving arm 81 away from arm 82. It can be set to a lower time direction by allowing string 79 to go slack. Thus, when the compute button 23B is next depressed, the time register 35B will move to the higher time setting by means of the spring force 83 or to a lower time setting by means of spring force 80 overriding spring force 83 to take the slack out of string 79.

Of course, the hour increments to the hour indicator wheel 36B are provided by the cam 72 acting on a lever 84 interconnected to a wheel 85 mounted for rotation on the shaft 42B and normally being urged in a counterclockwise direction in FIG. 8 by a spring force 86 in a manner similar to the spring force 80. The wheel 85 has an arm 87 cooperating with an arm 88 on the indicator wheel 36B which is urged in a clockwise direction in FIG. 8 by a spring force 89 which is weaker than the spring force 86 for increasing and decreasing the setting thereof in the same manner previously described for the minute wheel 37B.

Thus, it can be seen that the computer mechanism 68 of FIGS. 8 and 8A function substantially in the same manner as the computer mechanism 67 for the cooking operations previously described.

Figure 9:
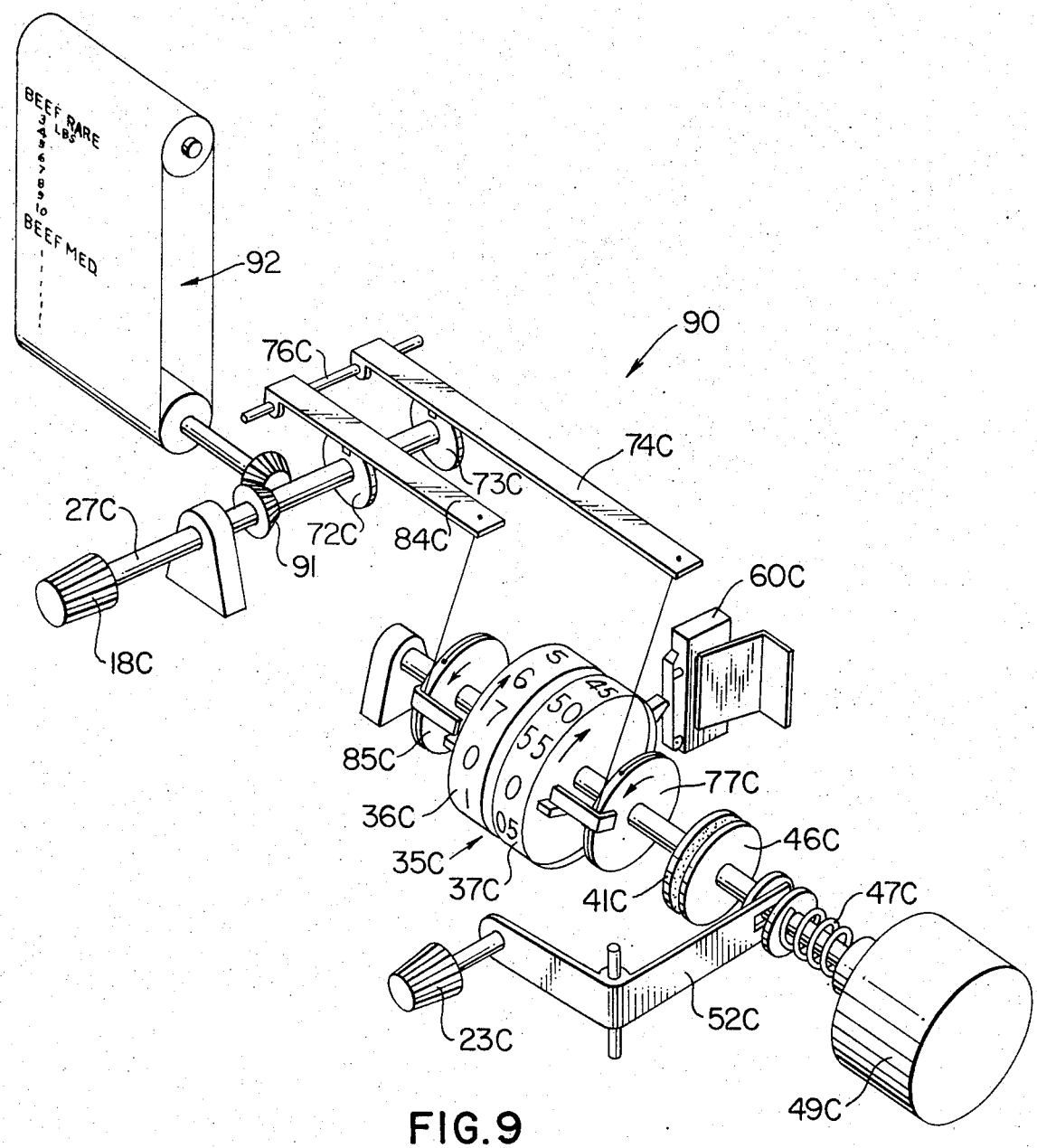
FIG. 9 is a view similar to FIG. 2 and illustrates another computer-controller device of this invention.

Another embodiment of this invention is generally indicated by the reference numeral 90 in FIG. 9 and is more properly called a programmer-controller rather than a computer because the mechanism 90 stores a time readout for each input, the parts of the system 90 similar to parts of the system 68 are indicated by like reference numerals followed by the reference letter C.

The system 90 has a single input mechanism 18C that operates the cams 72C and 73C in the manner previously described and is coupled by suitable gearing 91 to a chart means 92 that lists a complete range of weights for each different variation of meat type and/or desired end result. The programmer-controller 90 eliminates an adding mechanism but it adds to the input storage mechanism. It can be seen that it is difficult for this type of mechanism 90 to have intermediate settings, such as half way between rare and medium. However, such mechanism will provide a visual indication of cooking time based on at least the weight of the meat item.

Thus, it can be seen that not only does this invention provide an improved computer cooking means for visually indicating cooking time required for one or more input variables, but also this invention provides for actually operating the cooking apparatus to cook a desired meat item or the like to the desired degree of doneness in accordance with a cooking time formula based on at least one variable input corresponding to the weight of the desired meat item.

While the form of the invention now preferred has been disclosed as required by the patent statutes, other forms may be utilized all coming within the scope of the claims which follow.

What is claimed is:

1. A cooking computer for determining the cooking operation of a cooking apparatus, said computer having a manually settable weight input means for indicating a single selected indicated weight applicable to all meat items and corresponding to the weight of a particular meat item to be cooked, said computer having a second input means indicating a selected variable other than the weight of the meat and one that is self-explanatory so that one does not need additional information for the proper selection of the variable of the same, said second input means being operatively associated with said weight input means, and said computer having a time period output means operatively associated with said input means to provide as an output a cooking time period for said particular meat item computed as a function from both of said input means.

2. A cooking computer as set forth in claim 1 wherein said time period output means includes means for automatically indicating said computed cooking time period.

3. A cooking computer as set forth in claim 2 wherein said computer has a computer actuator operatively associated with said automatic indicating means, said actuator being adapted to cause said automatic indicating means to indicate said computed time period only after said weight input means has been set and then said actuator has been actuated.

4. A cooking computer as set forth in claim 2 wherein said computer has timer means operatively associated with said automatic indicating means for causing said indicating means to indicate elapsing time of said computed time period once said computed time period is being utilized.

5. A cooking computer as set forth in claim 1 wherein said computed cooking time period is based on a cooking time formula that is substantially the results of seventy times the square root of the weight setting of said computer or forty times the square root of the weight setting of said computer.

6. A cooking computer as set forth in claim 5 wherein said formula of said computer is also based on a fixed or variable factor added to said results to provide for a selected degree of doneness of said particular meat item, said selected degree of doneness comprising said second input means of said computer.

7. A cooking computer as set forth in claim 1 wherein said second input means of said computer comprises a meat doneness input means operatively associated with said weight input means and said time period output means, said meat doneness input means being adapted to set said computer at a doneness setting for said particular meat item whereby said computed cooking time period is based on a cooking formula that comprises the two input variables of weight and doneness.

8. A cooking computer as set forth in claim 7 wherein said cooking time formula for said computer is based substantially on the results of seventy times the square root of the weight setting of said computer plus the doneness setting of said computer or the results of forty times the square root of the weight setting of said computer plus the doneness setting of said computer.

9. A cooking computer as set forth in claim 1 wherein said computer has controller means operatively associated with said time period output means for operating a cooking apparatus for said computed cooking time period.

10. A cooking computer as set forth in claim 1 wherein said second input means indicates by words the variables thereof.

11. A cooking computer as set forth in claim 10 wherein said words provide for the selection of the degree of doneness of the meat item such as by "rare," "medium," and "well."

12. A cooking computer as set forth in claim 10 wherein said words provide for the selection of the meat type such as by "fowl" and "beef."

13. A cooking computer for determining the cooking operation of a cooking apparatus, said computer having a manually settable weight input means for indicating a single selected indicated weight applicable to all meat items and corresponding to the weight of a particular meat item to be cooked, said computer having a second input means indicating a selected variable other than the weight of the meat operatively associated with said weight input means, and said computer having a time period output means operatively associated with said input means to provide as an output a cooking time period for said particular meat item computed as a function from both of said input means, said second input means of said computer comprising a meat doneness input means operatively associated with said weight input means and said time period output means, said meat doneness input means weight being adapted to set said computer at a doneness setting for said particular meat item whereby said computed cooking time period is based on a cooking formula that comprises the two input variables of weight and doneness, said computer having means for providing another output means that a predetermined cooking temperature for the particular meat item should be reduced to another predetermined temperature at a particular time during the elapsing of said time period so that the particular meat item will be substantially at the doneness of the doneness setting of said computer at the termination of the computed cooking time period.

14. A cooking computer as set forth in claim 9 wherein said meat doneness input means is operatively associated with said temperature reducing output means to set said temperature reducing output means in accordance with the doneness setting of said computer.

* * * * *